(12) United States Patent
De Cesare et al.

(10) Patent No.: US 10,738,675 B2
(45) Date of Patent: Aug. 11, 2020

(54) METHOD AND APPARATUS TO SUPPLY WATER TO A TANK OF AN EXHAUST SYSTEM PROVIDED WITH EXHAUST GAS AFTER-TREATMENT FOR A COMBUSTION ENGINE

(71) Applicant: MAGNETI MARELLI S.p.A., Corbetta (IT)

(72) Inventors: Matteo De Cesare, Torremaggiore (IT); Nicola Torcolini, Bologna (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 136 days.

(21) Appl. No.: 15/912,737

(22) Filed: Mar. 6, 2018

(65) Prior Publication Data

US 2018/0258812 A1 Sep. 13, 2018

(30) Foreign Application Priority Data

Mar. 7, 2017 (IT) .......................... 102017000025322
Mar. 7, 2017 (IT) .......................... 102017000025325

(51) Int. Cl.
*F01N 3/20* (2006.01)

(52) U.S. Cl.
CPC ............. *F01N 3/206* (2013.01); *F01N 3/208* (2013.01); *F01N 3/2066* (2013.01);
(Continued)

(58) Field of Classification Search
CPC ............. F01N 2610/02; F01N 2610/12; F01N 2610/1406; F01N 2610/1413;
(Continued)

(56) References Cited

U.S. PATENT DOCUMENTS 8,181,448 B2 * 5/2012 Kwon ..................... F01N 3/208
60/286
2002/0023433 A1 2/2002 Goerigk et al.
(Continued)

FOREIGN PATENT DOCUMENTS

CN 203123844 U 8/2013
EP 1181972 A1 2/2002
(Continued)

OTHER PUBLICATIONS

Communication dated Jul. 3, 2018 transmitting the European Search Report dated Jun. 7, 2018 for European Application No. 18160597.3.

(Continued)

*Primary Examiner* — Phutthiwat Wongwian
*Assistant Examiner* — Diem T Tran
(74) *Attorney, Agent, or Firm* — Howard & Howard Attorneys PLLC

(57) ABSTRACT

An exhaust system provided with exhaust gas after-treatment for a combustion engine comprising an exhaust pipe and a pumping device, which is buried inside the tank, from which it draws so as to feed a water solution of urea under pressure to an electromagnetic injector; the tank is supplied with urea powder and water, which are mixed on the inside so as to obtain a water solution of urea with a variable concentration; and a water supply circuit to supply water to the tank, which is provided with a first pipe, which draws the water from a basin and is regulated by a first valve, which allows water to be introduced into the tank, if necessary, or to be drained to the surrounding environment when the water quantity already contained in the tank is sufficient.

11 Claims, 9 Drawing Sheets

(52) U.S. Cl.
CPC ...... *F01N 2610/02* (2013.01); *F01N 2610/12* (2013.01); *F01N 2610/142* (2013.01); *F01N 2610/144* (2013.01); *F01N 2610/1406* (2013.01); *F01N 2610/148* (2013.01); *F01N 2610/1413* (2013.01); *F01N 2610/1486* (2013.01); *F01N 2900/1811* (2013.01); *F01N 2900/1814* (2013.01); *F01N 2900/1818* (2013.01); *Y02T 10/24* (2013.01)

(58) Field of Classification Search
CPC ......... F01N 2610/142; F01N 2610/144; F01N 2610/148; F01N 2610/1486; F01N 2900/1811; F01N 2900/1814; F01N 2900/1818; F01N 3/206; F01N 3/2066; F01N 3/208; Y02T 10/24
See application file for complete search history.

(56) References Cited

U.S. PATENT DOCUMENTS

| | | | |
|---|---|---|---|
| 2004/0040288 A1* | 3/2004 | Jacob | B01D 53/8631 60/286 |
| 2008/0092531 A1* | 4/2008 | Suzuki | F01N 3/0821 60/301 |
| 2016/0003120 A1* | 1/2016 | Tsuchiya | F01N 3/2066 60/310 |
| 2016/0257181 A1* | 9/2016 | Zhou | B60H 1/3201 |

FOREIGN PATENT DOCUMENTS

| | | | |
|---|---|---|---|
| EP | 2927452 | A1 | 10/2015 |
| EP | 2975233 | A1 | 1/2016 |
| EP | 3018313 | A1 | 5/2016 |
| EP | 3078823 | A1 | 10/2016 |
| EP | 3085912 | A1 | 10/2016 |
| JP | 2006046287 | A | 2/2006 |
| JP | 2010043585 | A | 2/2010 |
| WO | 9949957 | A1 | 10/1999 |
| WO | WO2015-186559 | * | 10/2015 |

OTHER PUBLICATIONS

Search Report for Italian Application No. 201700025325 dated Nov. 15, 2017.
Search Report for Italian Application No. 201700025322 dated Nov. 16, 2017.
Communication dated Sep. 20, 2019 transmitting the Extended European Search Report dated Aug. 7, 2019 for European Application No. 19184985.0.

* cited by examiner

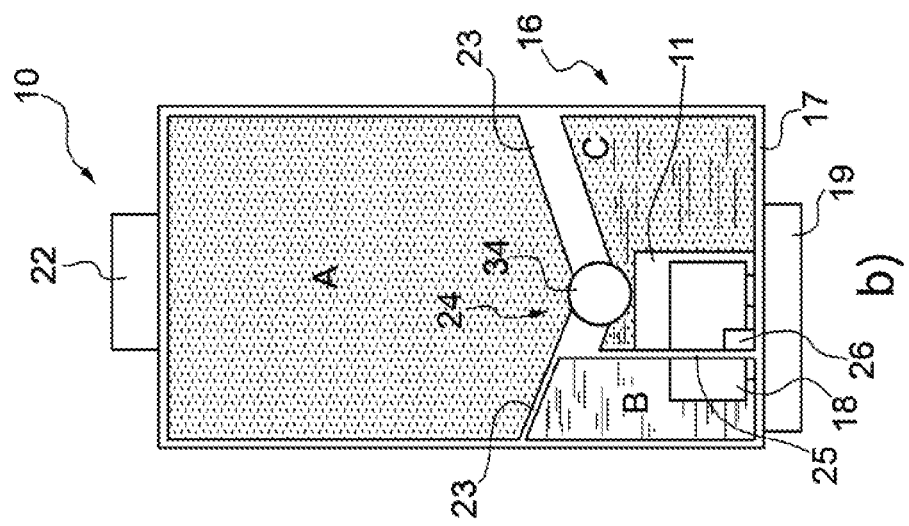
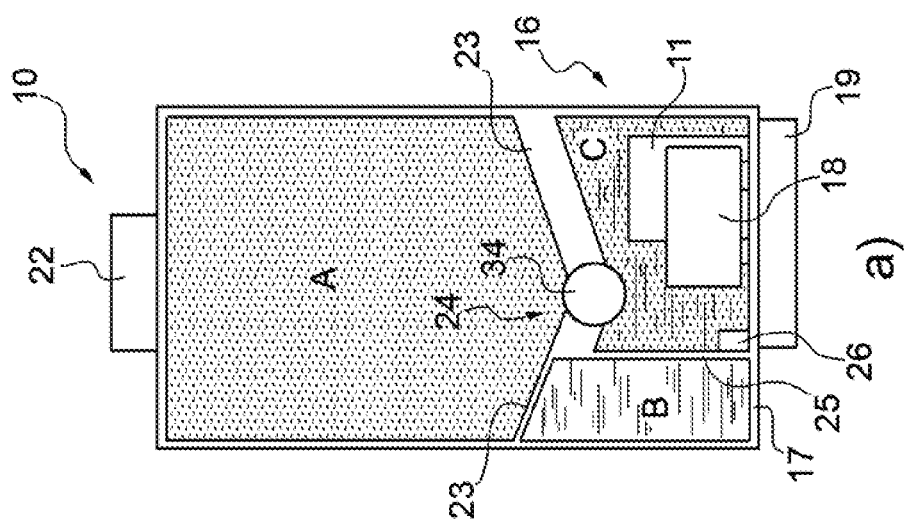
FIG.2

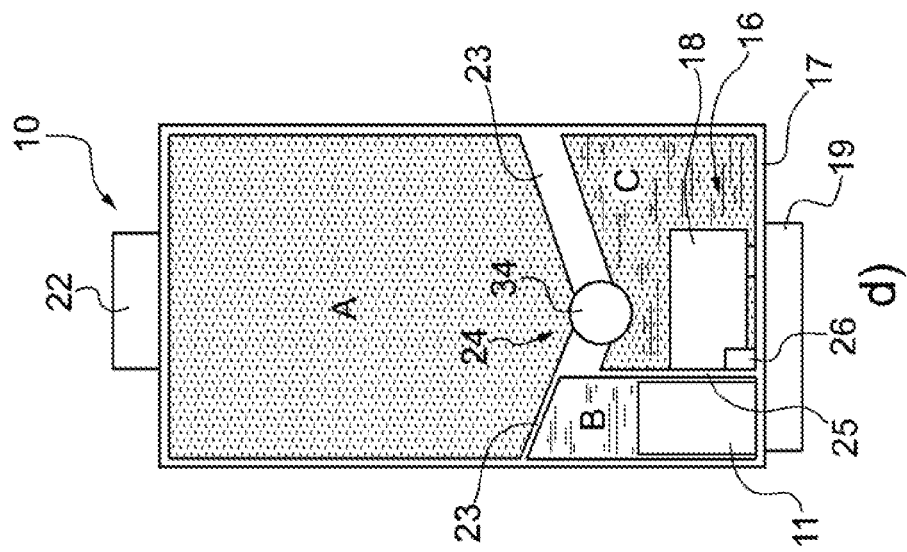
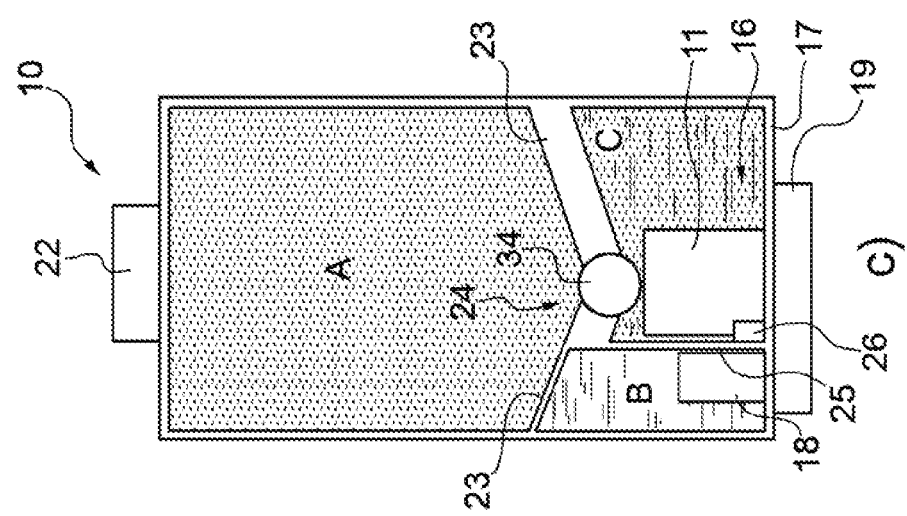
FIG.2

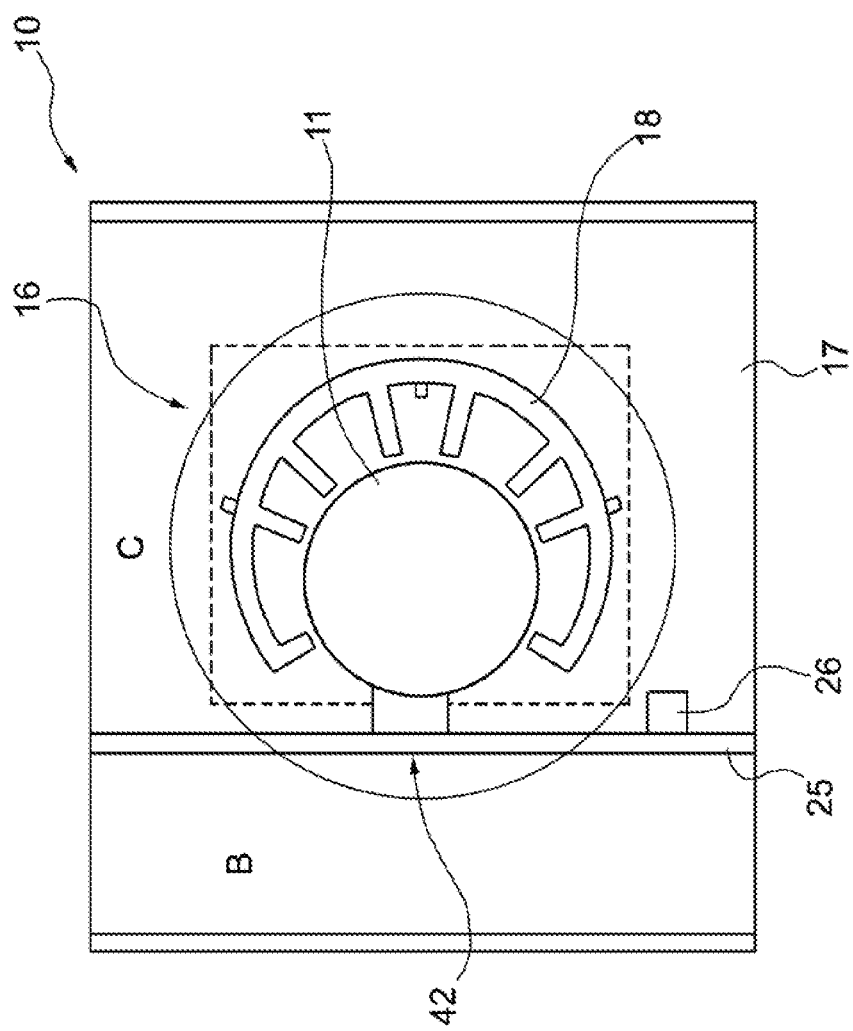

METHOD AND APPARATUS TO SUPPLY WATER TO A TANK OF AN EXHAUST SYSTEM PROVIDED WITH EXHAUST GAS AFTER-TREATMENT FOR A COMBUSTION ENGINE

PRIORITY CLAIM

This application claims priority from Italian Patent Applications No. 102017000025325 and No. 102017000025322 both filed on Mar. 7, 2017, the disclosure of which is incorporated by reference.

TECHNICAL FIELD

The invention relates to a method and an apparatus to supply water to a tank of an exhaust system provided with exhaust gas after-treatment for a combustion engine and to a method to produce a water solution of urea with a variable concentration inside a tank for an exhaust system provided with exhaust gas after-treatment for a combustion engine.

PRIOR ART

As it is known, international directives establishing the progressive reduction of the emissions of polluting gases produced by motor vehicles (the so-called "Euro5" and "Euro6" or "Tier2 Bin5" emission standards) set a very low limit for the quantity of $NO_x$ molecules that can be released into the atmosphere.

Compliance with these limits is very critical, especially for Diesel engines; for this reason, manufacturers have had the idea of providing the exhaust system of a Diesel engine with a selective catalytic reduction (SCR) system for $NO_x$, which is used to convert $NO_x$ molecules ($NO_2$ or NO) into water ($H_2O$) and nitrogen ($N_2$), which is an inert gas. The reaction of reduction of $NO_x$ molecules into nitrogen is difficult to be obtained without using an adequate reductant, typically ammonia ($NH_3$). The reductant must be injected into the exhaust system upstream of the SCR catalytic converter, so as to be mixed with exhaust gases before entering the SCR catalytic converter.

However, storing ammonia in a vehicle is hard to be handled due to evident safety reasons concerning the fact that ammonia is toxic. As a consequence, manufactures suggested storing and injecting a control fluid and, more in detail, a water solution of urea, which, because of the heat of the exhaust gases and partly due to a catalytic effect, decomposes into ammonia.

Therefore, the exhaust system is provided with a control fluid feeding device, which comprises an exhaust pipe, a tank containing the control fluid, and an actuator, in particular an injector, which is designed to inject the control fluid under pressure coming from the tank into the exhaust pipe. The feeding device further comprises a pump, which draws the control fluid from the tank and delivers the control fluid under pressure to the injector.

The control fluid is a reductant additive and, preferably, it is a water solution of urea, i.e. a 32.5% solution of urea, synthetic salt and demineralized water, commonly known as Ad-Blue. In use, because of the heat of the exhaust gases present inside the exhaust pipe, the urea injected into the exhaust pipe itself spontaneously decomposes into isocyanic acid (HNCO) and ammonia ($NH_3$), said ammonia operating as a reductant to help the reaction of resolution of $NO_x$ molecules into nitrogen ($N_2$) and water ($H_2O$). The isocyanic acid (HNCO), in turn, releases another mole of ammonia ($NH_3$) through hydrolysis.

The tanks currently used for the water solution of urea have remarkable sizes, so that they can ensure approximately 10,000-15,000 km of autonomy before having to fill the tank; reducing the sizes of these tanks would lead to a burdening of drivers, who would be forced to refill the water solution of urea every 8,000 or 9,000 km.

DESCRIPTION OF THE INVENTION

Therefore, the object of the invention is to provide an apparatus to supply water to a tank of an exhaust system provided with exhaust gas after-treatment for a combustion engine, which is not affected by the drawbacks of prior art and is easy to be manufactured, with a small impact on manufacturing costs.

A further object of the invention is to provide a method to supply water to a tank of an exhaust system, which is not affected by the drawbacks of prior art and is easy to be implemented, with a small impact on costs.

A further object of the invention is to provide a method to produce a water solution of urea with a variable concentration inside a tank for an exhaust system provided with exhaust gas after-treatment for a combustion engine, which is not affected by the drawbacks of prior art and is easy to be implemented, with a small impact on costs.

According to the invention, there are provided a method and an apparatus to supply water to a tank of an exhaust system provided with exhaust gas after-treatment for a combustion engine and a method to produce a water solution of urea with a variable concentration inside a tank for an exhaust system provided with exhaust gas after-treatment for a combustion engine according to the appended claims.

BRIEF DESCRIPTION OF THE DRAWINGS

The invention will now be described with reference to the accompanying drawings, showing a non-limiting embodiment thereof, wherein:

FIGS. 2a to 2d schematically show alternative embodiments of a tank of the exhaust system of FIG. 1 according to the invention;

FIG. 5 shows, in plan view, a detail of the tanks of FIG. 2;

PREFERRED EMBODIMENTS OF THE INVENTION

Figure 1:
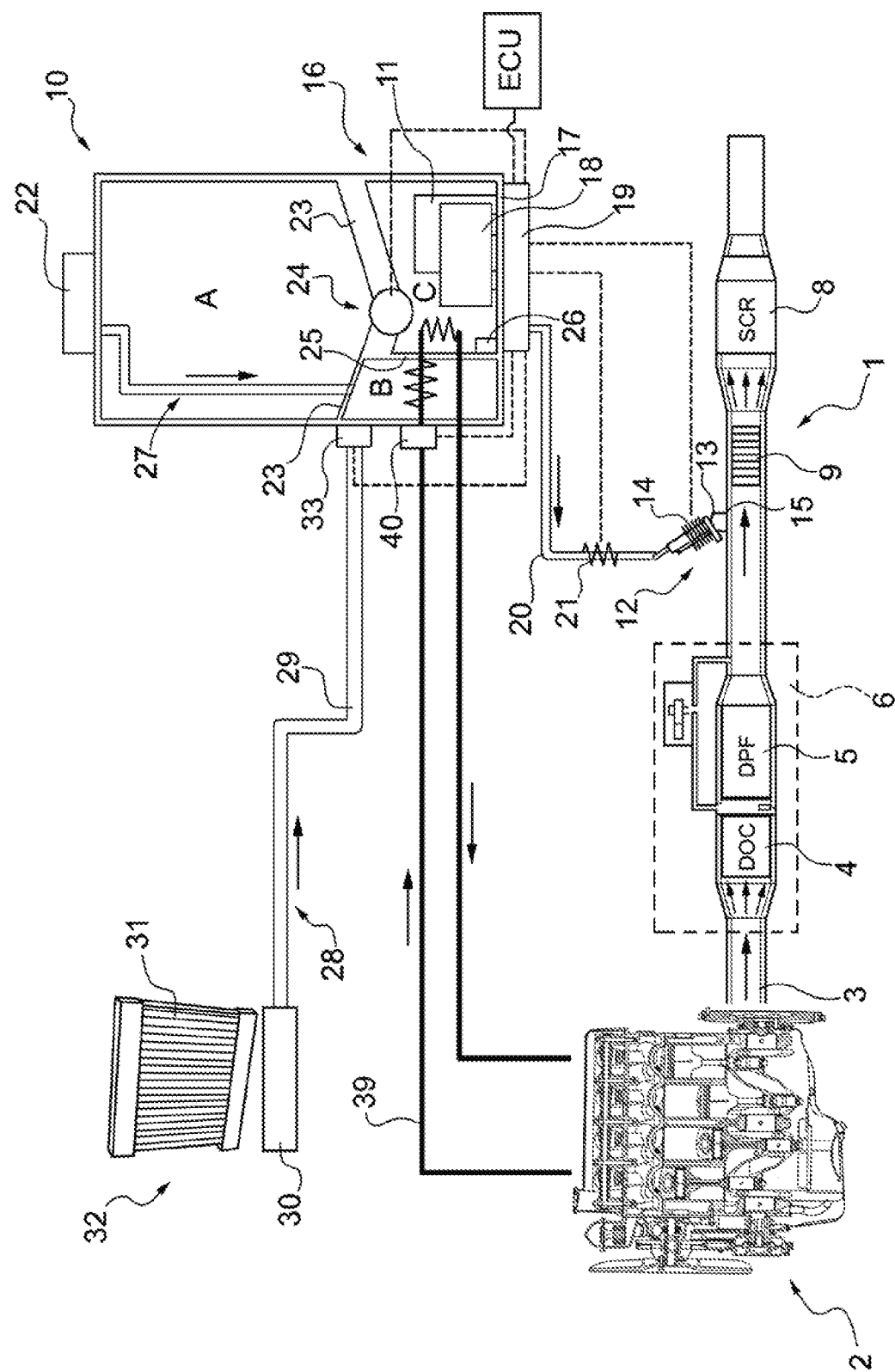
FIG. 1 schematically shows a combustion engine comprising an exhaust system provided with exhaust gas after-treatment.

In FIG. 1, number 1 indicates, as a whole, an exhaust system to release—into the atmosphere—the gases produced by the combustion of an internal combustion engine 2 comprising an exhaust pipe 3, which originates from an exhaust manifold. Along the exhaust pipe 3 there are arranged, in succession, a Diesel oxidation catalyst 4 and a Diesel particulate filter 5. According to a first variant, the oxidation catalytic converter 4 and the Diesel particulate filter 5 are arranged one after the other inside a common tubular container 6. The oxidation catalytic converter 4 preferably is capable of also storing nitrogen oxides (Lean-NOx Trap/NOx storage catalyst).

The exhaust system 2 is provided with a selective catalytic reduction (SCR) system 7 for the after-treatment of $NO_x$ molecules (NO e $NO_2$), which is arranged along the exhaust pipe 3 downstream of the Diesel particulate filter 5.

According to the variant shown in FIG. 1, the SCR system 7 comprises one single SCR catalytic converter 8, which is arranged along the exhaust pipe 3. According to a further variant, which is not shown herein, the SCR system 7 comprises an assembly of (usually three) SCR catalytic converters 8 arranged in series, which, together, optimize the SCR function for the after-treatment of $NO_x$ molecules.

According to a preferred variant, the SCR catalytic converter 8 and the Diesel particulate filter 5 are integrated inside a common tubular container.

According to a preferred variant, along the exhaust pipe 3, upstream of the SCR catalytic converter 8, there is arranged a static mixer 9, which fulfils the function of generating turbulences in the exhaust gases present inside the exhaust pipe 3.

The SCR system 7 comprises a tank 10 for the production of a control fluid and a pump 11, which draws from the tank 10 so as to feed the control fluid under pressure to an injection device 12 (known as urea dosing valve), which comprises a known electromagnetic injector 13 designed to inject the control fluid under pressure into the exhaust pipe 3 and a connection element 13 to fix the electromagnetic injector 13 to a connection pipe 15 laterally projecting out of the exhaust pipe 3. The electromagnetic injector 13 is suited to inject the control fluid under pressure into the exhaust pipe 3 alternatively upstream or downstream of the SCR catalytic converter 8.

The control fluid is a reductant additive and, preferably, it is a water solution of urea, i.e. a solution of urea, synthetic salt and demineralized water.

In use, because of the heat of the exhaust gases present inside the exhaust pipe 3, the urea injected into the exhaust pipe 3 itself spontaneously decomposes into isocyanic acid (HNCO) and ammonia ($NH_3$), said ammonia operating as a reductant inside the SCR system 7 so as to help the reaction of resolution of $NO_x$ molecules into nitrogen ($N_2$) and water ($H_2O$). The Isocyanic acid NHCO also decomposes through hydrolysis, thus forming a molecule of ammonia ($NH_3$) and one of carbon dioxide ($CO_2$).

The SCR system 7 further comprises a feeding device 16 (also known as urea delivery module), which is connected to the tank 10 with the water solution of urea and comprises the pump 11 drawing from the tank 10 in order to feed the water solution of urea under pressure to the electromagnetic injector 13.

Therefore, the feeding device 16 comprises the pump 11, which is buried inside the tank 10 and is fitted into the tank 10 from the bottom, namely through an opening (not shown) made in a lower wall 17 of the tank 10.

The feeding device 16 further comprises a heating body 18 (better shown in FIG. 5), which is also buried inside the tank 10 and is arranged so as to completely or partially surround the pump 11. The heating body 18 is made of a metal material or of a ceramic material or of another heat conductor material and, in use, is controlled by a control unit 19. The feeding device 16 further comprises a cartridge filter, which is also buried inside the tank 10 and is arranged so as to completely or partially surround the pump 11.

The pump 11, which draws from the tank 10, is designed to feed the water solution of urea under pressure to the electromagnetic injector 13 through an outlet pipe 20. The outlet pipe 20 preferably is provided with a heating organ 21, which is controlled by the control unit 19.

According to a first variant, the pump 11 feeding the water solution of urea to the electromagnetic injector 13 is a rotary pump, which is designed to invert the direction of rotation, so as to be able to both feed the water solution of urea under pressure to the electromagnetic injector 13 and, when needed, suck the water solution of urea present inside the feeding device 16 downstream of the pump 11 itself (i.e. in the outlet pipe 20 and/or inside the electromagnetic injector 13). The pump 11 is suited to be controlled in a non-efficient manner, changing the sequence of the windings and generating a thermal power due to Joule effect, which facilitates the unfreezing of the water solution of urea close to the pump 11.

Alternatively, the pump 11 feeding the water solution of urea to the electromagnetic injector 13 is a piston pump, which is provided with an electromagnetic actuator.

Figure 10:
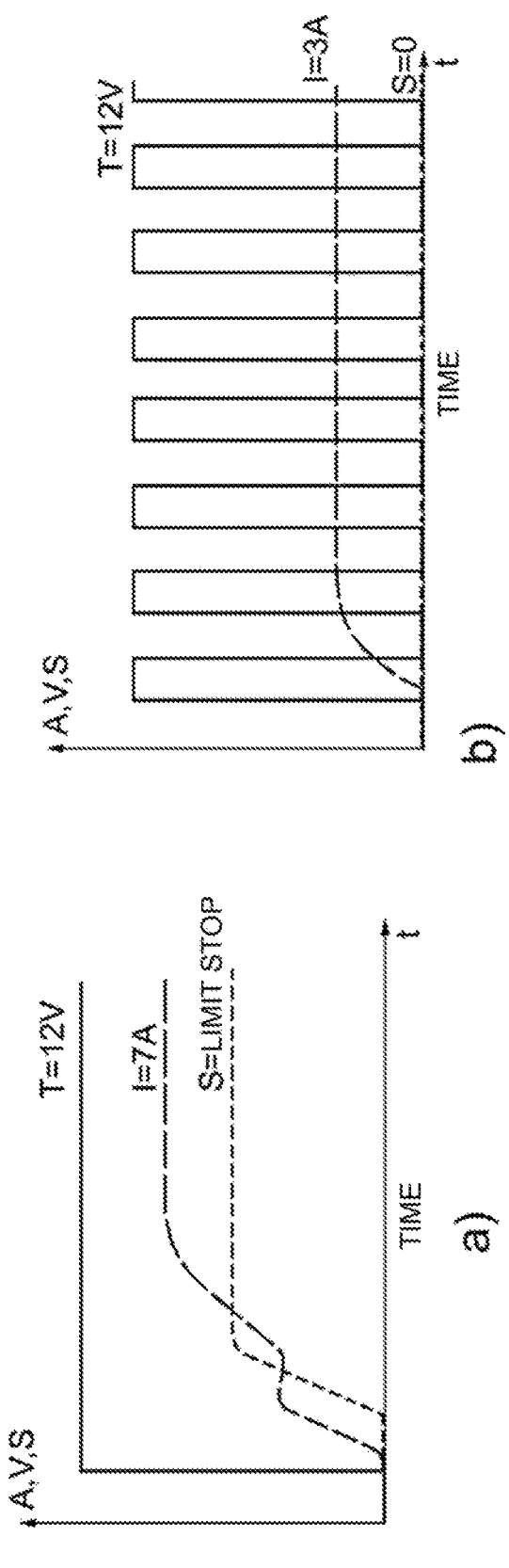
FIG. 10 shows different actuation profiles of a piston pump in the tanks of FIG. 2.

As you can better see in FIG. 10, the pump 11 can be controlled with an actuation profile that is such is to generate a thermal power due to Joule effect, which facilitates the unfreezing of the water solution of urea or of the water located close to the pump 11. In particular, the pump can be controlled with two different types of controls: a control without pumping, namely without delivery of liquid (shown in FIGS. 10a and 10b), and a control with pumping, i.e. with delivery of liquid (shown in FIG. 10c). In the control without pumping shown in FIG. 10a, the pump 11 is powered with a constant voltage, preferably at 12 Volt, until it reaches the maximum absorption current (for example equal to 7 Amperes) and so that a pumping element of the pump 11 reaches a limit stop position; then, said maximum absorption current value is maintained (so that the pumping element remains in the limit stop position) for the amount of time needed by the pump 11 to operate as heater of the water solution of urea or of the water located close to the pump 11. In this case, the voltage be kept constant at the maximum value or can be changed impulsively.

With this type of actuation you obtain one single stroke of the pumping element up to the limit stop position, which could not be accomplished in case there were ice inside the pump 11.

On the other hand, in the control without pumping shown in FIG. 10b, the pump 11 is powered with a inconstant voltage profile and with a constant current profile equal to a value (e.g. 3 Amperes) which is smaller than the maximum absorption current value and is such as to forbid any movement of the pumping element (which does not even reach the limit stop position). In particular, in this case, the voltage is changed impulsively so as to keep the current constant at the predetermined value.

In the control with delivery of liquid (namely, with pumping) shown in FIG. 10c, between two successive controls in which the pump 11 is controlled with delivery of liquid, which are identified by time intervals $t_1$ and $t_2$, there is interposed a control without pumping carried out in one of the ways described above (even alternated with one another), which is identified by time interval $t_3$. In this way, even during the normal operation of the pump 11, it is possible to produce the thermal power available for the unfreezing of the water solution of urea or of the water located close to the pump 11.

With this type of actuation of the pump 11, the energy delivered to the electromechanical actuator generates a thermal power due to Joule effect, which, indeed, facilitates the unfreezing of the water solution of urea or of the water close to the pump 11. FIG. 10 shows a comparison of the developments of the current (indicated with I), the voltage (indicated with T) and the displacement (indicated with S) of the pumping element in the different solutions of actuation of the pump 11 described above.

As you can better see in FIGS. 2a to 2d, the tank 10 is divided into three areas indicated with A, B and C, which are separated by inner partitions.

In the upper area A there is stored urea powder. The area A is accessible from the top, so as to allow it to be filled with urea powder, and is closed by a cap 22.

Figure 3:
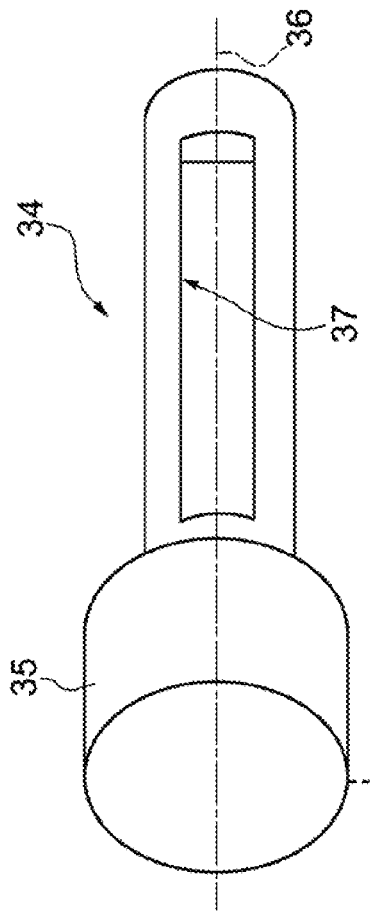
FIG. 3 is a perspective view of a detail of the tanks of FIG. 2.

The upper area A is separated from the lower portion of the tank 10 by means of two partitions 23, which are inclined so as to form a V-shape. The two partitions 23 converge towards a dosing device 24, which is shown in FIG. 3 and will be better described hereinafter. The V-shaped inclination of the two partitions 23 allows the urea powder to be conveyed towards the dosing device 24, thus preventing the urea powder from settling on the walls of the area A.

The lower area of the tank 10, on the other hand, is divided into an area B, which collects water on the inside, and into an area C, where the water solution of urea is created with a variable concentration. The two areas B, C are separated by a wall 25, where a dosing valve 26 is arranged, which is controlled by the control unit 19 so as to allow the water to flow from the area B to the area C.

The tank 10 is made of a plastic material, preferably enriched with additives to increase the thermal insulation of the tank 10 from the outside.

The water collecting area B is supplied through a pipe 27 (shown in FIG. 1) for manual filling, which can be accessed through the cap 22 and goes through the area A.

Furthermore, according to a preferred variant shown in FIG. 1, the SCR system 7 comprises a water supply circuit 28, which comprises, in turn, a pipe 29, which draws the water from the basin 30 collecting the condensate water of an evaporator 31 of a conditioning system 32 of the vehicle and leads it into the area B. The water flow is regulated by a three-way valve 33, which is housed on the tank 10, is controlled by the control unit 19 and allows the water to be introduced into the area B, if needed, or to be drained to the surrounding environment when the water quantity already contained in the area B is sufficient.

Figure 8:
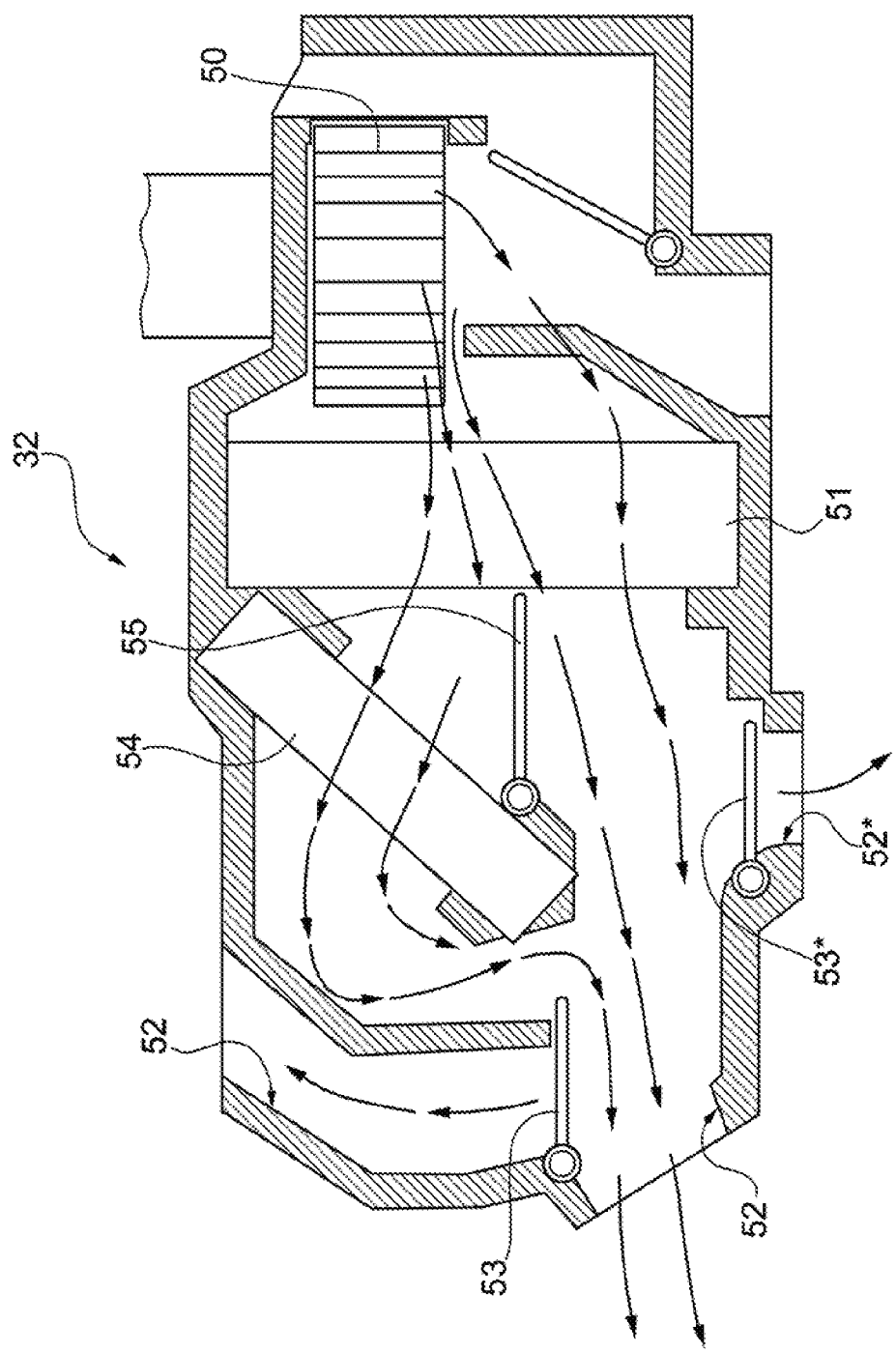
FIG. 8 schematically shows a conditioning system of a vehicle.

As you can schematically see in FIG. 8, an air flow is pushed into the conditioning system 32 through a fan 50 and hits the evaporator 31 arranged in the engine compartment, where a coolant fluid absorbs heat from the air crossing it.

The cooled air is alternatively pushed out of the vehicle through a pipe 52* or into the cabin of the vehicle through a plurality of pipes 52 directed towards the people seating in the vehicle or towards the windshield. A number of partitions 53, 53* associated with respective pipes 52, 52* are controlled between a closing position closing the respective pipe 52 and an opening position opening the respective pipe 52, and vice versa. The conditioning system 32 further comprises a heater 54 in the form of a liquid/air heat exchanger, which is arranged in the cabin of the vehicle adjacent to the evaporator 31. A further partition 55 is provided, which is interposed between the evaporator 31 and the heater 54 and is controlled between a closing position, in which the air flow is prevented from flowing from the evaporator 31 towards the heater 54, and an opening position, in which the air flow is allowed to flow from the evaporator 31 towards the heater 54.

According to a first variant, the water supply circuit 28 comprises a pipe, which draws the water from a basin collecting rain water and leads it to the area B, after having filtered it. In this case, again, the water flow is regulated by a three-way valve, which is controlled by the control unit 19 and allows the water to be introduced into the area B, if necessary, or to be drained to the surrounding environment when the quantity of water already contained in the area B is sufficient.

According to a further variant, the water supply circuit 28 comprises a thermoelectric conversion device, such as Peltier cells, which are arranged close to the evaporator 31.

Figure 4:
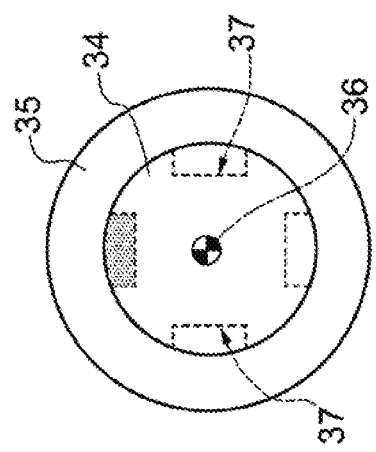
FIG. 4 is a front view of the detail of FIG. 3.

The dosing device 24 shown in FIGS. 3 and 4, instead, is designed to permit the passage of the urea powder from the area A to the area C.

The dosing device 24 is defined by a cylinder 34 connected, at an end of its, to an electric motor 35, which controls the rotation of the cylinder 34 around its symmetry axis 36. The cylinder 34 is provided with a number of peripheral grooves 37, which are designed to collect a quantity of urea powder in the area A to be delivered to the area C after having made a 180° rotation movement around the symmetry axis 36.

The number of grooves 37 preferably ranges from one to four; and the grooves 37 are uniformly distributed around the symmetry axis 36.

The electric motor 35 is controlled by the control unit 19 and the rotation speed is determined based on the quantity of urea powder needed and on the number as well as capacity of the peripheral grooves 37. The cylinder 34 is made of a metal material or, alternatively, of a plastic material.

According to a preferred embodiment, the control unit 19 is connected to a plurality of sensors, such as for example a temperature sensor to detect the current temperature of the water solution of urea inside the area C (open loop control mode), a temperature sensor inside the area B, a level sensor to detect the level of the water solution of urea inside the area C, a level sensor to detect the level of water inside the area B, a sensor to detect the concentration of the water solution of urea inside the area C.

According to alternative embodiments shown in FIG. 2, the feeding device 16 is arranged:

i) in the area C, where the water solution of urea is created, so that the heating body 18 can heat the water solution of urea (variant shown in FIG. 2a); or ii) in the area of the wall 25, astride the water collecting area B and the area C, where the water solution of urea is created, so that the heating body 18 can heat both the water and the water solution of urea (variant shown in FIG. 2b); or iii) the heating body 18 is arranged in the area B, so as to heat the water, whereas the pump 11 is housed inside the area C (variant shown in FIG. 2c); or iv) the heating body 18 is arranged in the area C, so as to heat the water solution of urea, whereas the pump 11 is housed inside the area B, so as to heat the water (variant shown in FIG. 2d).

In the first two cases i) and ii), the control unit 19 is configured to control the operation of the heating body 18 so as to allow the water solution of urea in the area C to be unfreezed based on the current temperature detected by the temperature sensor.

In case ii), the operation of the heating body 18 also permits the heating of the water collected in the area B simultaneously with the heating of the water solution of urea contained in the area C, preferably based on the current temperature detected by the temperature sensor.

In case iii), the pump 11 housed in the area C is used to heat the water solution of urea and is controlled so as to generate a thermal power due to Joule effect, which is sufficient to unfreeze the water solution of urea close to the pump 11, whereas the operation of the heating body 18 permits the unfreezing of the water collected in the area B.

The heating/unfreezing strategy involves supplying a current through the windings, changing the sequence of the windings and/or the timing/frequency, so as to generate a moving force for the pumping element of the pump 11. Clearly, the pumping element of the pump 11 is not free to rotate because of the freezing of the water solution of urea; in this way, the energy supplied by the electric motor actuator generates a thermal power due to Joule effect which facilitates the unfreezing of the water solution of urea close to the pump 11.

In case iv), the managing of the water solution of urea described above is applied to heat the water present in the area B.

The layout of the tank 10 shown in FIG. 2 has a vertical extension, which helps the tank 10 be installed in the engine compartment of the vehicle. In this case, according to a preferred variant, the SCR system 7 also comprises a recirculation circuit 38 for the conditioning fluid of the combustion engine 2 (shown in FIG. 1). The recirculation circuit 38 comprises a pipe 39 where the conditioning fluid flows at high temperatures and which goes through the area B and/or the area C in order to heat the water and/or the water solution of urea. The passage of the conditioning fluid is regulated by a valve 40, which is housed on the tank 10 and is controlled by the control unit 19, which permits a regulation of the transfer of heat from the conditioning fluid to the water or to the water solution of urea.

In use, the water coming from the area B and the urea powder coming from the area A get mixed in the area C; the water solution of urea obtained by so doing is removed by the pump 11 and fed, through the outlet pipe 20, to the electromagnetic injector 13.

Figure 9:
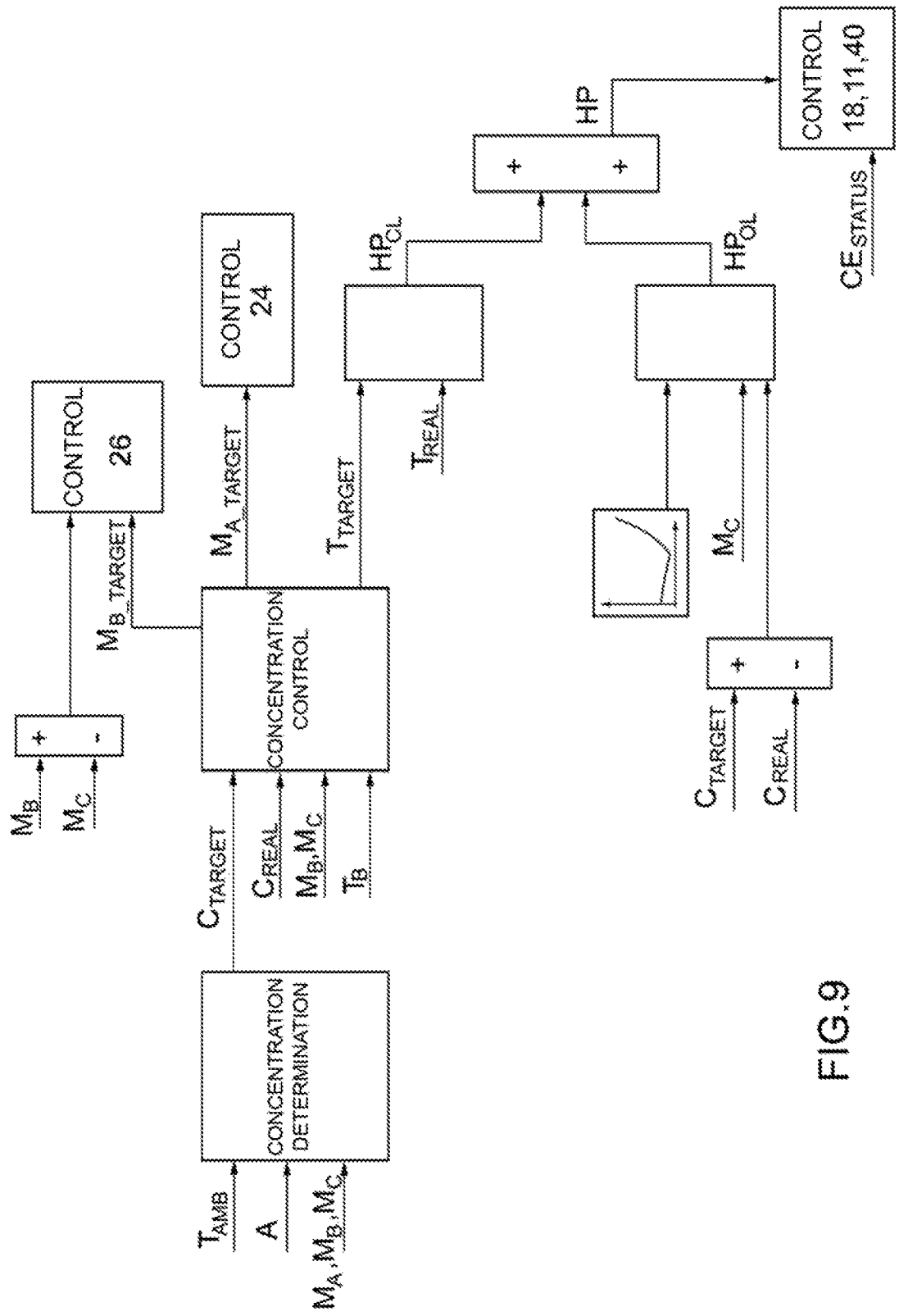
FIG. 9 is a block diagram showing the strategy used to determine the optimal concentration of the water solution of urea in the tanks of FIG. 2.

The control unit 19 is suited to determine the optimal concentration of urea in the solution according to the block diagram shown in FIG. 9. In particular, the control unit 19 gathers a plurality of parameters, such as the room temperature $T_{AMB}$ (° C.); the desired endurance A; the quantity $M_C$ of water solution of urea already contained in the area C and detected by means of the level sensor; the quantity $M_B$ of water already contained in the area B and detected by means of the level sensor; and the urea powder $M_A$ stored in the area A (as better explained below); based on these parameters the control unit determines the target concentration value $C_{TARGET}$ of the water solution of urea.

The target concentration value $C_{TARGET}$ of the water solution of urea is sent, as an input, to a concentration control block together with a plurality of other parameters, such as the temperature $T_B$ in the area B; the quantity $M_C$ of water solution of urea already contained in the area C and detected by means of the level sensor; the quantity $M_B$ of water already contained in the area B and detected by means of the level sensor; and the real concentration value $C_{REAL}$ of the water solution of urea in the area C, which is detected by means of the relative sensor. Based on the acquired parameters, the concentration control block determines the target quantity $M_{B\_TARGET}$ of water in the area B, the target quantity $M_{A\_TARGET}$ of urea in the area A and the target temperature $T_{TARGET}$ in the area C.

The target quantity $M_{B\_TARGET}$ of water in the area B and the difference between the quantity $M_C$ of water solution of urea already contained in the area C and detected by means of the level sensor and the quantity $M_B$ of water already contained in the area B and detected by means of the level sensor are used by the control unit 19 to control the dosing valve 26.

The target quantity $M_{A\_TARGET}$ of urea in the area A is used by the control unit 19 to control the dosing device 24.

The target temperature $T_{TARGET}$ in the area C and the real temperature $T_{REAL}$ in the area C detected by the relative sensor area used by the control unit 19 to determine a closed-loop contribution $HP_{CL}$ of the heating energy needed for the water solution of urea.

On the other hand, an open-loop contribution $HP_{OL}$ of the heating energy needed for the water solution of urea is determined based on the quantity $M_C$ of water solution of urea already contained in the area C, based on the development of the freezing temperature of a water solution of urea, based on the concentration of urea and based on the difference between the target concentration value $C_{TARGET}$ of the water solution of urea and the real concentration value $C_{REAL}$ of the water solution of urea in the area C, which is detected by means of the relative sensor.

Figure 6:
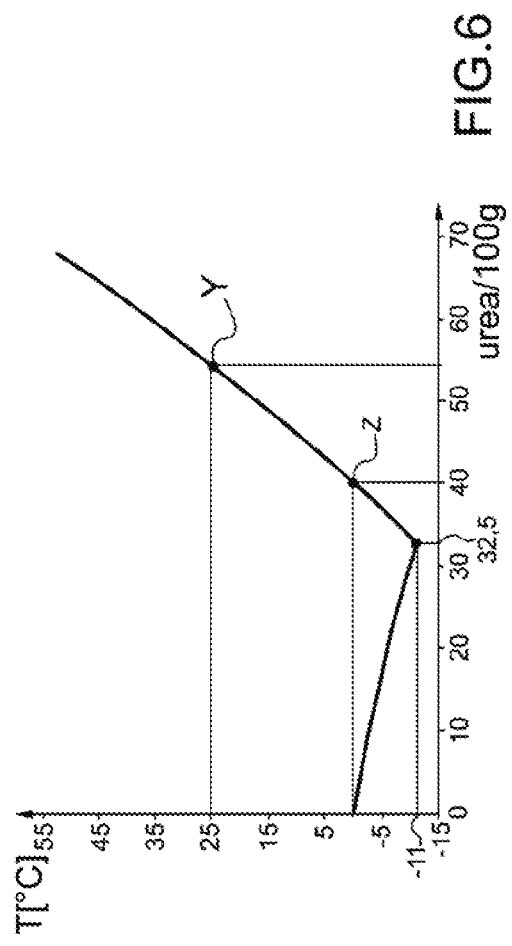
FIG. 6 shows the development of the freezing temperature of a water solution of urea based on the concentration of urea.

According to FIG. 6, indeed, the freezing temperature of the water solution of urea has a development which is inversely proportional to the percentage of urea contained in it and reaches a minimum value of −11.5° C. with a concentration of urea equal to 32.5% (in other words, the freezing of the water solution of urea takes place at temperatures that get smaller and smaller as the percentage of urea in it increases and reaches the minimum value with a percentage of urea equal to 32.5%) and, subsequently, there is an inversion in the development, namely the freezing temperature has a development which is directly proportional to the percentage of urea contained in the water solution of urea. The control unit 19 is suited to increase the concentration of urea up to the maximum acceptable value based on the external temperature. For example, in case the external temperature is approximately 25° C., the concentration of urea can be increased up to approximately 54% (point indicated with Y in FIG. 6). With the same consumption of water, increasing the concentration of urea allows you to significantly increase the quantity of ammonia produced, which is available for the reduction of $NO_x$ molecules.

The control unit 19 is designed to order the opening of the dosing valve 26, so as to permit the passage of water from the area B to the area C; and, subsequently, to order the activation of the dosing device 24 to allow the urea powder to be delivered to the area C. The dosing device 24 keeps delivering urea powder to the area C until the desired concentration of the water solution of urea is reached.

According to a preferred variant, in order to improve the process of dissolution of the urea powder in the water, the heating body 18 is activated.

It should be pointed out that the tank 10 described above allows you to change the concentration of the water solution of urea based on multiple conditions, such as for example the temperature.

If, on the other hand, you want to operate with a fixed concentration (greater than 32.5%), you need to activate the heating body 18 so as to always keep the temperature in the area C above the freezing/solidification limit value for that given concentration value. Basically, according to FIG. 6, should you want to maintain a fixed concentration of 40%, you would have to control the heating body 18, when needed, so as to always keep the temperature above 0° C. (point indicated with Z in FIG. 6).

Alternatively, if, on the other hand, you do not want to operate with a fixed concentration, the concentration of the water solution of urea can be reduced by controlling the dosing valve 26 so as to introduce water, so that the water solution of urea present in the area C can be diluted based on the temperature detected.

Therefore, the total value HP of heating energy is given by the sum of the closed-loop contribution $HP_{CL}$ of the heating energy needed for the water solution of urea and the open-loop contribution $HP_{OL}$ of the heating energy needed for the water solution of urea and is used by the control unit 19, after having checked the status $CE_{STATUS}$ of the combustion engine 2, to control the heating body 18 and/or other heating organs (such as, for example, the pump 11 and/or the valve 40).

It should be pointed out that the dosing device 24 must ensure a perfect seal, so as to forbid the undesired passage of urea powder from the area A to the area C, which would cause a change in the concentration of the water solution of urea. Furthermore, if, in case of emergency, a 32.5% water solution of urea (commonly known as Ad-Blue) is delivered to the area A instead of the powder urea, the dosing device 24 must be designed so as to let the liquid flow from the area A to the area C.

Figure 7:
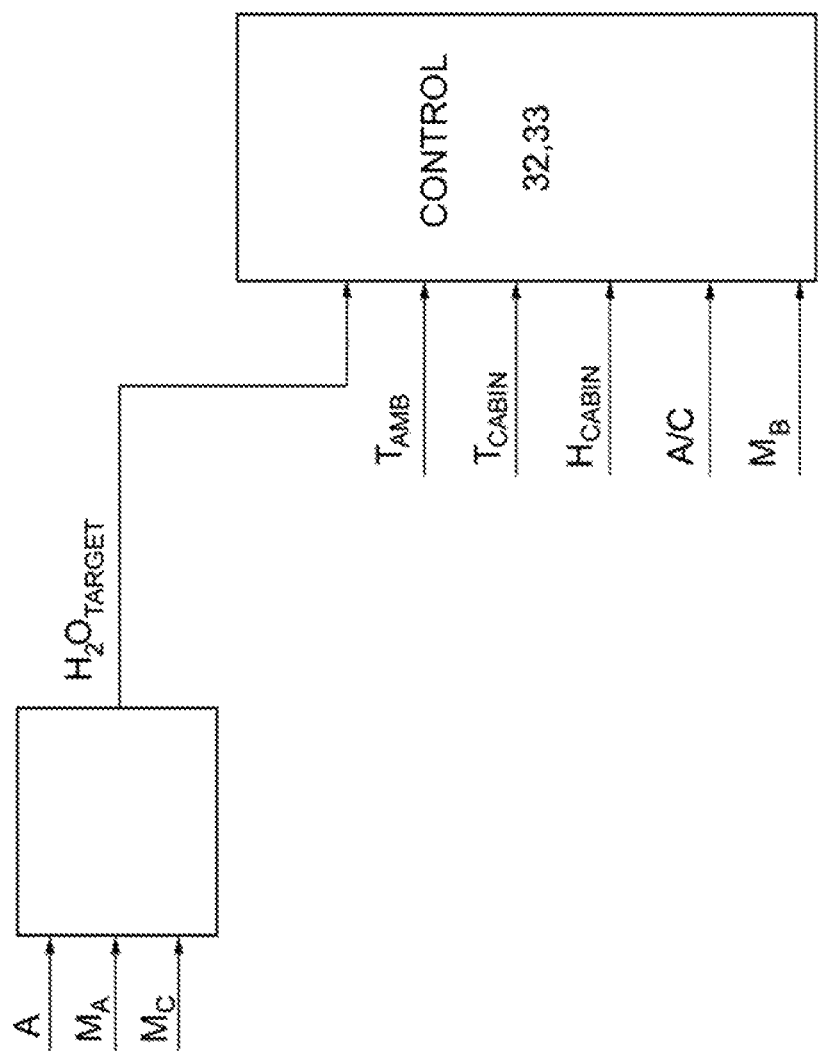
FIG. 7 is a block diagram showing the strategy used to determine the optimal quantity of water to the supplied to the tanks of FIG. 2.

According to FIG. 7, the control unit 19 is configured to gather a number of parameters, such as:
 the desired endurance A;
 the quantity $M_C$ of water solution of urea in the area C through the dedicated level sensor; and
 the powder urea $M_A$ stored in the area A;
 based on these parameters, the control unit determines the desired quantity $H_2O_{TARGET}$ of water to be introduced into the area B.

As far as the powder urea stored in the area A is concerned, this parameter can be determined through the signal sent by a pressure sensor or by a load cell housed in the area A, in particular, in the area of the two partitions 23 inclined so as to form a V-shape. According to a preferred variant, the pressure sensor or the load cell are overmoulded in one of the two partitions 23.

Alternatively, the quantity of urea powder stored in the area A can be determined, assuming of starting from a full load area A and knowing the number of rotations made by the cylinder 34 of the dosing device 24, through the following formula:

$$V = V_I * (n_{GIRI} * n_{SEDI} * V_{SEDE}) \quad [1]$$

V current volume of powder urea stored in the area A;
$V_I$ initial volume of urea powder stored in the area A, with a full load;
$n_{GIRI}$ number of rotation made by the cylinder 34 of the dosing device 24;
$n_{SEDI}$ number of grooves 37 made in the cylinder 34; and
$V_{SEDE}$ volume of each groove 37.

Therefore, the control unit 19 is configured to gather a number of parameters, such as:
 desired quantity $H_2O_{TARGET}$ of water to be introduced into the area B;
 room temperature $T_{AMB}$;
 temperature in the cabin of the vehicle $T_{CABIN}$;
 humidity in the cabin of the vehicle $H_{CABIN}$;
 A/C state of the conditioning system 32, whether active or turned off; and
 the quantity $M_B$ of water in the area B through the dedicated level sensor;
 based on these parameters, the control unit controls the conditioning system 32 and the valve 33.

As already mentioned above, the area B is provided with a level sensor, which is connected to the control unit 19 and communicates with an electronic control unit ECU of the internal combustion engine 2. When, through the level sensor, a water level inside the area B is detected which is below a limit value and depending on the desired quantity $H_2O_{TARGET}$ of water to be introduced into the area B, the control unit 19 sends a signal to the electronic control unit ECU to control the conditioning system 32.

In order to make sure that the desired quantity $H_2O_{TARGET}$ of water to be introduced into the area B is made available by the supply circuit 28, the production of water must be ensured even in case the conditioning system 32 of the vehicle is not operating because the driver does not require the conditioning of the cabin.

Different conditions can occur. In case of a request for a quantity $H_2O_{TARGET}$ of water to be introduced into the area B, if the conditioning system 32 of the vehicle is operating, the water is taken from the collecting basin 30. Or, in case of a request for a quantity $H_2O_{TARGET}$ of water to be introduced into the area B, if the conditioning system 32 of the vehicle is not operating and the air vents of the cabin are open (namely, the partitions 53 are in the opening position), the air flow is allowed to flow through the evaporator 31 and the heater 54, so as to introduce dehumidified air into the cabin through the pipes 52, though at the same temperature of the cabin.

Finally, in case of a request for a quantity $H_2O_{TARGET}$ of water to be introduced into the area B, if the conditioning system 32 of the vehicle is not operating and the air vents of the cabin are closed (namely, the partitions 53 are in the closing position), the air flow is allowed to flow through the evaporator 31 and the heater 54 and is conveyed outwards through the pipe 52*.

According to a preferred variant, in order to reduce the consumption of fuel, the strategy described above, which involves forcing the compressor of the conditioning system 32, is preferably implemented in engine cut-off conditions and/or with the accelerator pedal released and with an engine speed, expressed in revolutions per minute, exceeding a threshold value.

According to a further variant, the water contained inside the area B is used for the conditioning of the electromagnetic actuator 13. According to FIG. 5, a further valve 42 is arranged between the area B and the area C so as to allow the pump 11 to directly suck water (and not a water solution containing urea) from the area B, in order to then feed it for the conditioning of the electromagnetic injector 13 through the outlet pipe 20.

The description above explicitly relates to the case of an internal combustion engine 2, but the tank 10 and the control method described above can advantageously be applied to any combustion engine with oxygen excess requiring a reduction of $NO_x$ molecules.

The tank 10 and the method described above have some advantages: first of all, they are easy to be manufactured and implemented, with a small impact on the costs of the system. In particular, the tank 10 allows you to obtain a greater endurance when dealing with the refilling of the water solution of urea compared with the water solution having a 32.5% concentration of urea, which is commonly used and known as Ad-Blue.

The invention claimed is:

1. An apparatus to supply water to a tank for an exhaust system provided with exhaust gas after-treatment for a combustion engine; the apparatus comprises the tank and the exhaust system comprises an exhaust pipe and a pumping device, which is buried inside the tank and draws from the tank so as to feed a water solution of urea under pressure to an electromagnetic injector designed to inject the water solution of urea under pressure into the exhaust pipe; the tank is supplied with urea powder and water, which are mixed on the inside so as to obtain a water solution of urea with a variable concentration; the apparatus includes a water supply circuit to supply water to the tank, which is provided with a first pipe, wherein the first pipe draws the water from the basin collecting the condensate water of an evaporator of a conditioning system, which comprises a heater arranged downstream of the evaporator; and is regulated by a first three-way valve, which is opened in one mode to allow water to be introduced into the tank, and operable in another mode to allow water to be drained to the surrounding environment when the water quantity already contained in the tank is sufficient; and wherein a water level inside the tank is detected; and in case the water level inside the tank is below a limit value, the passage of an air flow is forced through the evaporator and the heater so as to ensure the production of water.

2. The apparatus according to claim 1 and comprising a third pipe to feed the water solution of urea under pressure from the pumping device to the electromagnetic injector; wherein the third pipe is provided with a second heating organ.

3. The apparatus according to claim 1, wherein the tank is provided with a temperature sensor for the water solution of urea, a level sensor for the water solution of urea, a temperature sensor for the water and a sensor to detect the concentration of the water solution of urea.

4. A method to control an apparatus to supply water to a tank of an exhaust system provided with exhaust gas after-treatment for a combustion engine according to claim 1; the method comprises the steps of:

determining an objective concentration of the water solution of urea;

detecting a water quantity to be introduced into the tank in order to obtain the objective concentration; and controlling the opening of the first three-way valve so as to introduce into the tank the water needed to obtain the objective concentration.

5. The method according to claim 4, wherein the conditioning system comprises a number of partitions associated with respective pipes, which introduce air into the cabin; the method comprises the further step of introducing air into the cabin, in case said partitions are in an opening positions, or draining air outwards, in case said partitions are in a closing position.

6. The method according to claim 4, wherein the step of forcing the passage of an air flow through the evaporator and the heater so as to ensure the production of water is exclusively carried out in engine cut-off conditions and/or in released accelerator pedal conditions with an engine speed exceeding a threshold value.

7. A method to produce a water solution of urea with a variable concentration inside a tank for an exhaust system provided with exhaust gas after-treatment for a combustion engine; said exhaust system comprises an exhaust pipe and a pumping device, which is buried inside the tank and draws from the tank so as to feed a water solution of urea under pressure to an electromagnetic injector designed to inject the water solution of urea under pressure into the exhaust pipe; and the tank is divided, on the inside, into a first urea powder storing area (A), a second water collecting area (B) and a third area (C) in communication with the first area (A) and the second area (B), where the water solution of urea with a variable concentration is mixed; the method comprising:

determining an objective concentration of the water solution of urea;

detecting a concentration of the water solution of urea already contained inside the third area (C);

determining the quantity of water and urea powder to be introduced into the third area (C) in order to obtain the objective concentration depending on the concentration of the water solution of urea already contained inside the third area (C);

wherein the pumping device is a piston pump and the method includes the further steps of controlling the piston pump so as to generate a thermal power due to Joule effect, which facilitates the unfreezing of the water solution of urea;

controlling the piston pump until a maximum absorption current value is reached, which allows a pumping element of the piston pump to reach a limit stop position; and maintaining said maximum absorption current value for an amount of time needed by the piston pump to operate as a heater of the water solution of urea located close to the piston pump.

8. The method according to claim 7, wherein the objective concentration of the water solution of urea is determined based on some parameters chosen from a group including room temperature, the desired endurance of the tank, the level of water inside the second area (B), the level of water solution of urea in the third area (C), and the estimation of the quantity of urea powder present in the first area (A).

9. The method according to claim 7, wherein the tank comprises a heating body buried inside the third area and arranged so as to at least partially surround the pumping assembly; the method comprises the further step of activating the heating body so as to improve the process of dissolution of the urea powder in the water.

10. The method according to claim 7, wherein the pumping device alternating controls pumping without delivery of water solution of urea and with delivery of water solution of urea.

11. The method according to claim 7 and comprising the further steps of:

controlling the piston pump with an inconstant voltage profile until a given current value is reached;

maintaining said current value for the amount of time needed by the piston pump to operate as a heater of the water solution of urea located close to the piston pump; wherein said current value is smaller than the maximum absorption current value and so as to prevent any movement of a pumping element of the piston pump.

* * * * *